(12) United States Patent  (10) Patent No.: US 6,695,257 B2
Lin  (45) Date of Patent: Feb. 24, 2004

(54) EJECTION ESCAPE SYSTEM FOR A PASSENGER AIRPLANE

(76) Inventor: Jung-Min Lin, No.4, Lane 29, Ren 3rd Rd., Renai Chiu, Keelung City (TW), 200

( * ) Notice: Subject to any disclaimer, the term of this patent is extended or adjusted under 35 U.S.C. 154(b) by 0 days.

(21) Appl. No.: 10/205,439

(22) Filed: Jul. 26, 2002

(65) Prior Publication Data

US 2004/0016850 A1 Jan. 29, 2004

(51) Int. Cl.$^7$ .......................... B64D 25/12; B64D 25/10
(52) U.S. Cl. ................ 244/141; 244/140; 244/122 AF
(58) Field of Search ............................... 244/147, 142, 244/149, 145, 138 R, 139, 151 B, 140–141, 122 AF

(56) References Cited

U.S. PATENT DOCUMENTS

| | | | | |
|---|---|---|---|---|
| 1,630,211 A | * | 5/1927 | Ostand | 244/138 R |
| 2,390,230 A | * | 12/1945 | Trusty | 244/141 |
| 2,552,181 A | * | 5/1951 | Kieinhans | |
| 2,671,622 A | * | 3/1954 | Sauliniar | 244/141 |
| 2,699,305 A | * | 1/1955 | Turner et al. | 244/141 |
| 2,971,728 A | * | 2/1961 | Martin | 244/122 AF |
| 2,998,213 A | * | 8/1961 | Pitts | 244/122 AF |
| 3,559,932 A | * | 2/1971 | Ternes | |
| 3,642,236 A | * | 2/1972 | Stanley | 244/138 R |
| 3,721,407 A | * | 3/1973 | Clarke | 244/122 AF |
| 3,726,499 A | * | 4/1973 | Stencel | 244/141 |
| 3,756,546 A | * | 9/1973 | Carson, Jr. et al. | 244/183 R |
| 4,225,101 A | * | 9/1980 | Brown | 244/141 |
| 4,273,305 A | * | 6/1981 | Hinds | 244/160 |
| 4,508,296 A | * | 4/1985 | Clark | |
| 4,667,901 A | * | 5/1987 | Herndon | |
| 4,699,336 A | * | 10/1987 | Diamond | 244/140 |
| 4,720,064 A | * | 1/1988 | Herndon | |
| 4,747,565 A | * | 5/1988 | Spinosa et al. | |
| 4,813,634 A | * | 3/1989 | Zuck | 244/122 A |
| 4,911,382 A | * | 3/1990 | Aronne | |
| 4,982,916 A | * | 1/1991 | Dupont et al. | 244/122 AF |
| 5,046,687 A | * | 9/1991 | Herndon | |
| 5,297,761 A | * | 3/1994 | Kendall et al. | 244/140 |
| 5,921,504 A | * | 7/1999 | Elizondo | 244/140 |
| 6,213,427 B1 | * | 4/2001 | Mareska | |
| 6,382,563 B1 | * | 5/2002 | Chiu | 244/140 |
| 6,494,404 B1 | * | 12/2002 | Meyer | |

* cited by examiner

*Primary Examiner*—Michael J. Carone
*Assistant Examiner*—L. Semunegus
(74) *Attorney, Agent, or Firm*—Troxell Law Office PLLC

(57) ABSTRACT

An ejection escape system for passenger airplane that there is a locking mechanism at the connection of the left top cabin cover, the right top cabin cover with the airplane body, there is also a locking mechanism at the connection of the left top cabin cover and the right top cabin cover, the passenger seat is an ejection escape seat, the switches for the locking mechanism and the ejection escape seat are installed in the cockpit, where the pilot can turn on the locking mechanism switch to open the left and right top cabin covers and turn on the ejection escape switch to eject the seat out of the airplane through the opening of the left and right top cabin covers.

10 Claims, 9 Drawing Sheets

EJECTION ESCAPE SYSTEM FOR A PASSENGER AIRPLANE

BACKGROUND OF THE INVENTION

1. Field of the Invention

The invention relates to an ejection escape system for a passenger airplane, especially a system to increase the opportunity for passengers to escape from an airplane through ejection of passenger seat out of the airplane.

2. Description of the Prior Art

Due to rapid technology development and pursuit of quality life, recent technology has been used to develop many products, among which transportation tools are developed so that people can save a lot of transportation time without the need to walk. The fastest current transportation tool with the longest travel distance is the airplane, which has lower probability of accident than other transportation tools like cars and ships. However, when airplane accident occurs, if passengers fail to escape, which means passengers' lives are held by pilots, and if pilots mishandle or are unable to handle the situation, it will cause more serious injury and damage than car accidents and ship accidents. Even if the airplane accident is caused by malfunction of mechanical devices, all the passengers still can not escape and will share the risk with the pilots.

Therefore, there are still some shortcomings for the current airplanes, which need immediate improvement.

In view of the above shortcomings, the inventor was very eager to seek improvement. After many years of efforts, the inventor has finally completed the development of an ejection escape system for passenger airplanes.

SUMMARY OF THE INVENTION

The objective of the present invention is to provide an ejection escape system that the top cabin cover can be open for the passenger seat to be ejected out of the airplane so the passengers have increased opportunity to escape from the airplane.

Another objective of the present invention is to provide an ejection escape system that has an ejection device for left top cabin cover and right top cabin cover to be ejected toward the two sides of the airplane so they will not hit the airplane and cause any danger when they depart from the airplane.

Another objective of the present invention is to provide an ejection device that can eject left top cabin cover and right top cabin cover toward the two sides of the airplane so the ejection escape system will not hit the left top cabin cover and the right top cabin cover and casualties may be avoided.

The ejection escape system for the passenger airplane to reach the above objective comprises:

An airplane, which contains a body, a left top cabin cover and a right top cabin cover;

A locking mechanism, which comprises several buckle pins and the same quantity of buckle holes at the corresponding position; and Ejection escape seat, which includes: a seat, a safety belt, a parachute and an ejection device, among which the ejection device is set on seat back and the parachute on the safety belt, further, with the two ends of the safety belt attached to the two sides of the seat by fasteners;

The locking mechanism is installed at left top cabin cover, right top cabin cover and the corresponding sides on airplane body, wherein through the locking mechanism, the left top cabin cover, right top cabin cover and airplane body are connected and similarly each ejection seat is attached to the cabin through a locking mechanism.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

Figure 1:
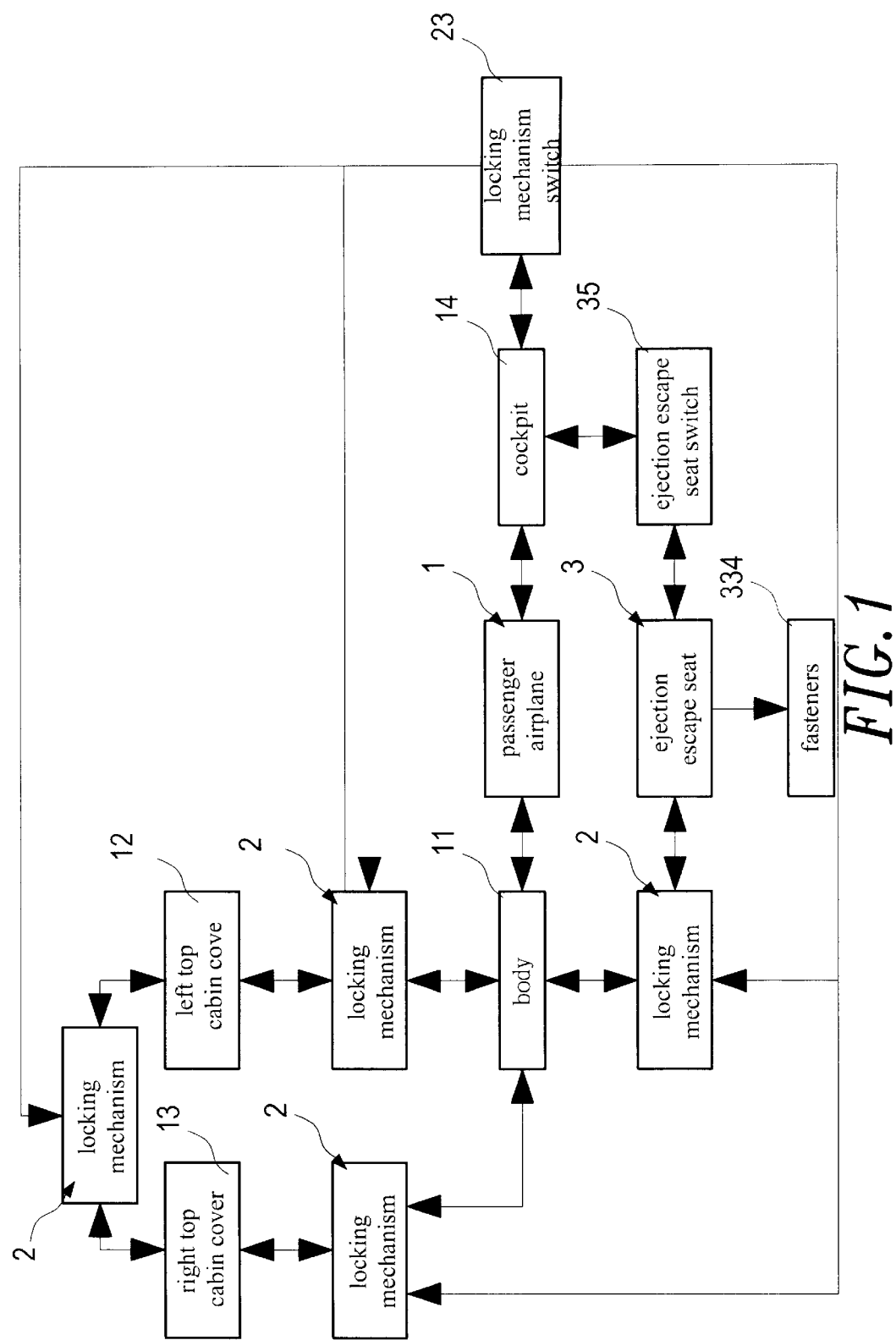
FIG. 1 is a layout diagram for an ejection escape system of the passenger airplane.
Figure 2:
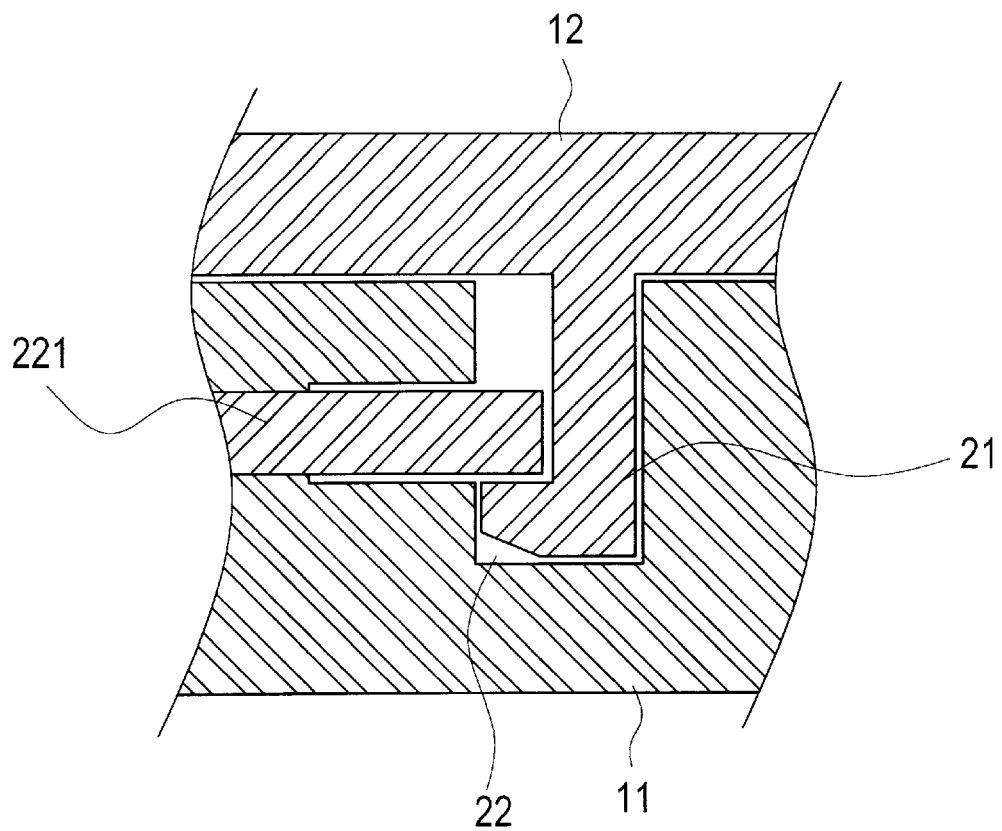
FIG. 2 is a side view diagram for the locking mechanism.
Figure 3:
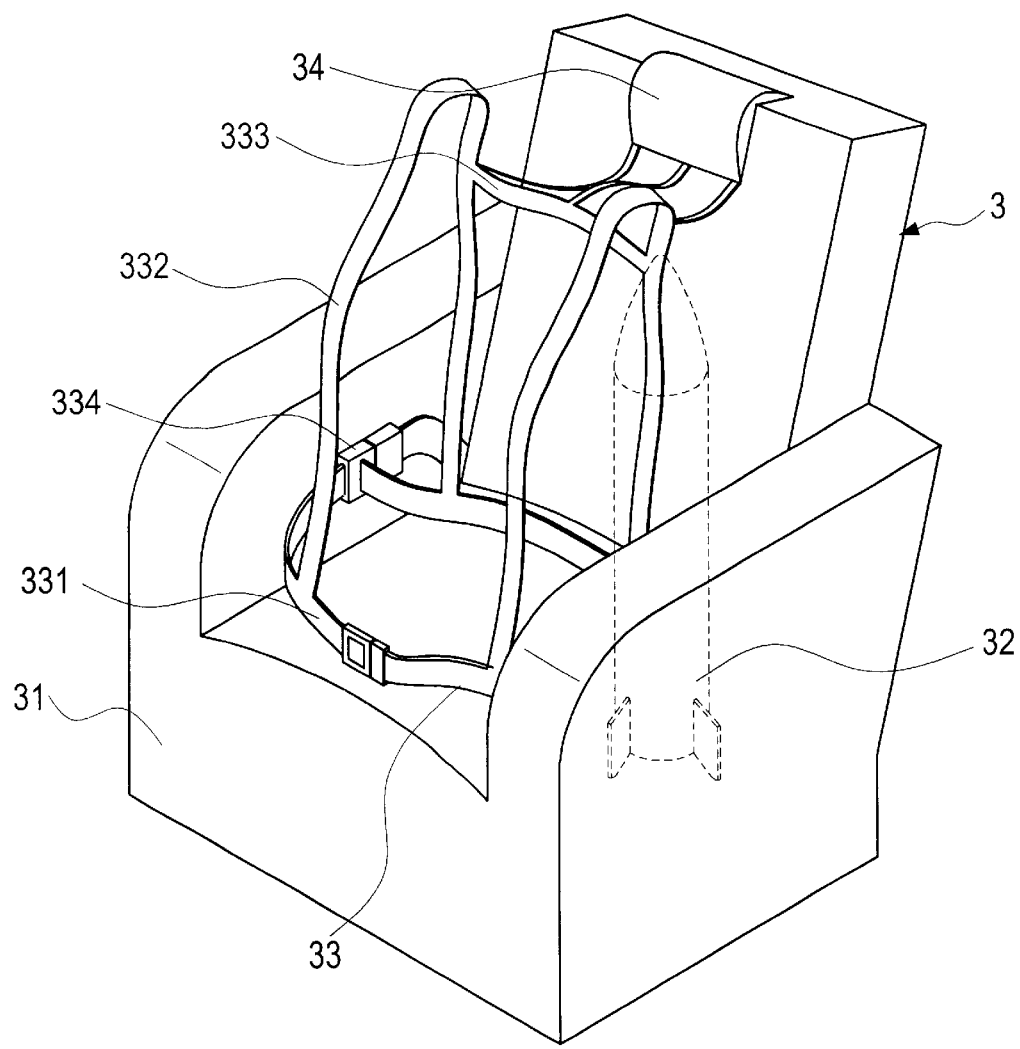
FIG. 3 is the three dimensional configuration diagram for the ejection escape seat.
Figure 4:
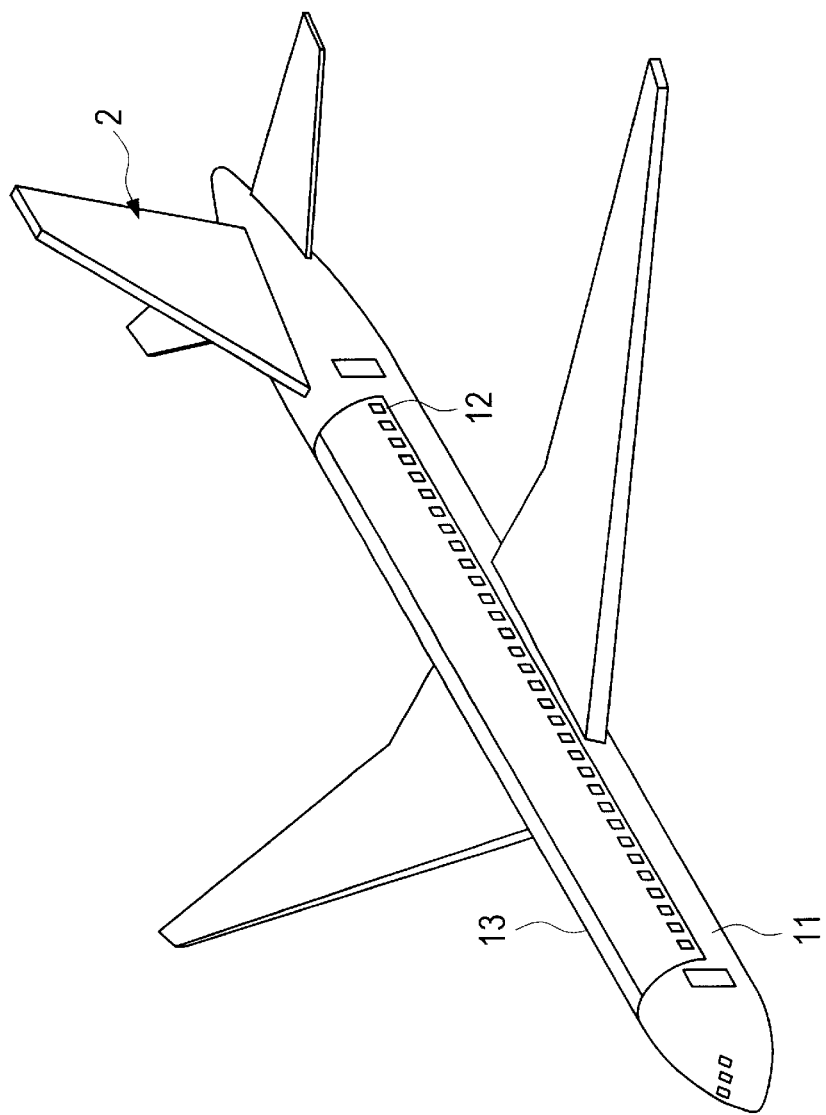
FIG. 4 is an illustration for the use of the ejection escape system for passenger airplane 1.
Figure 5:
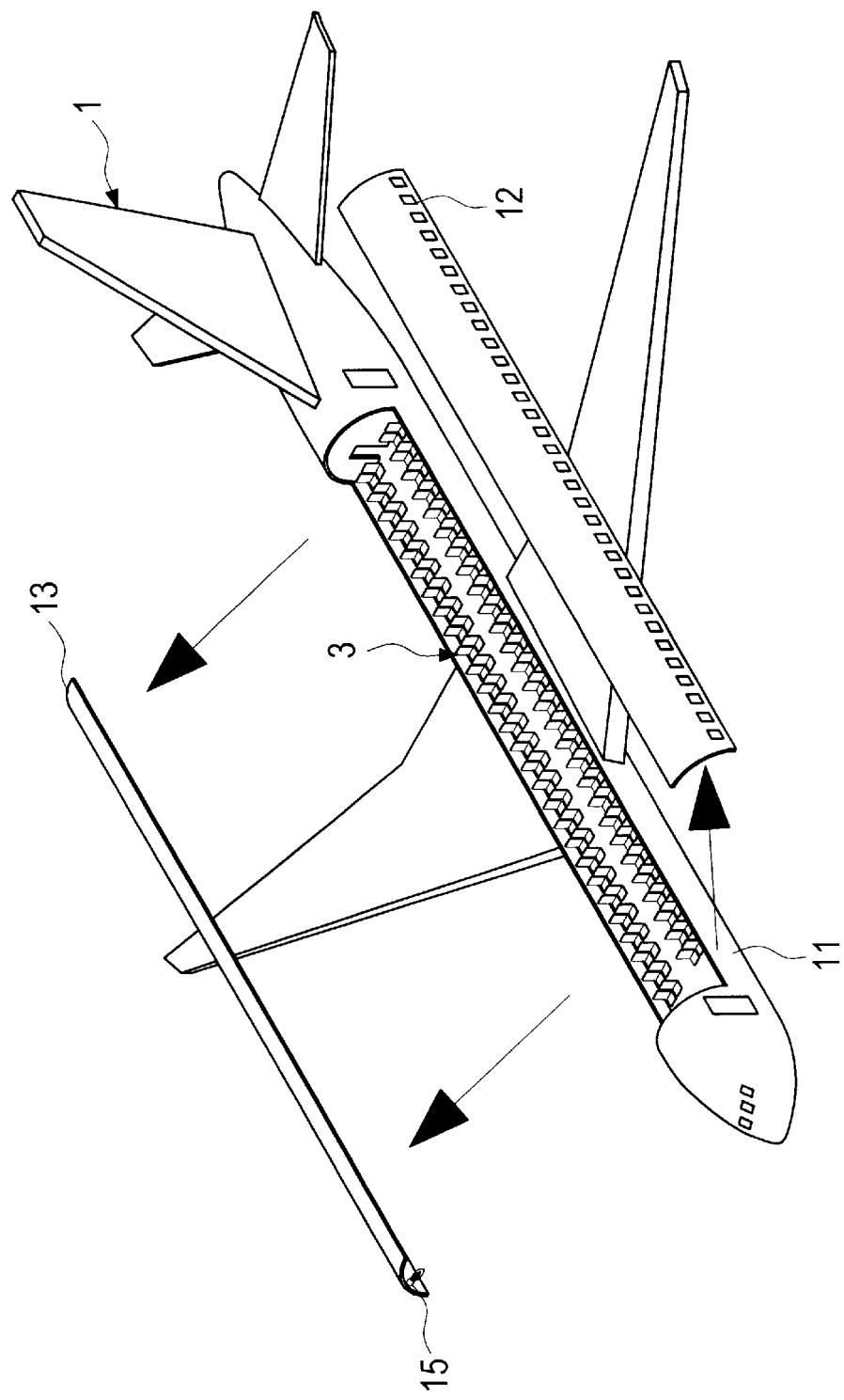
FIG. 5 is an illustration for the use of the ejection escape system for passenger airplane 2.
Figure 6:
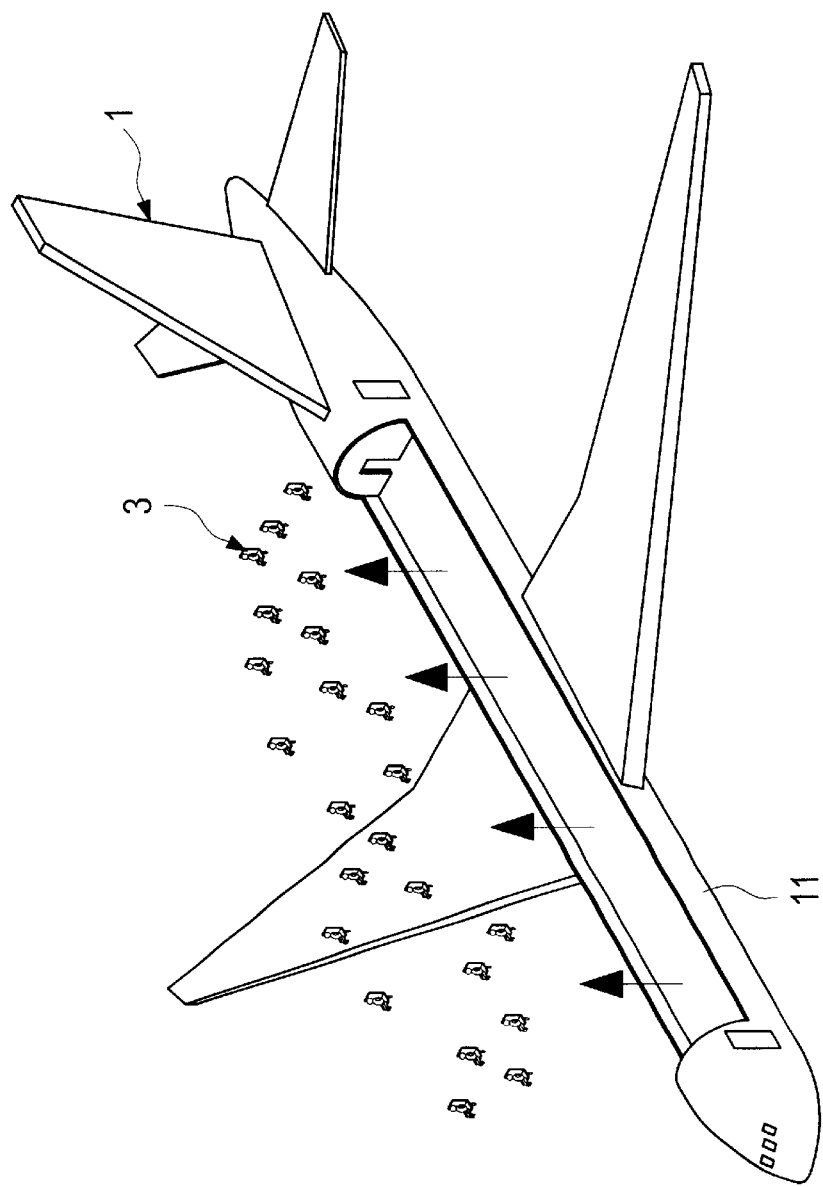
FIG. 6 is an illustration for the use of the ejection escape system for passenger airplane 3.
Figure 7:
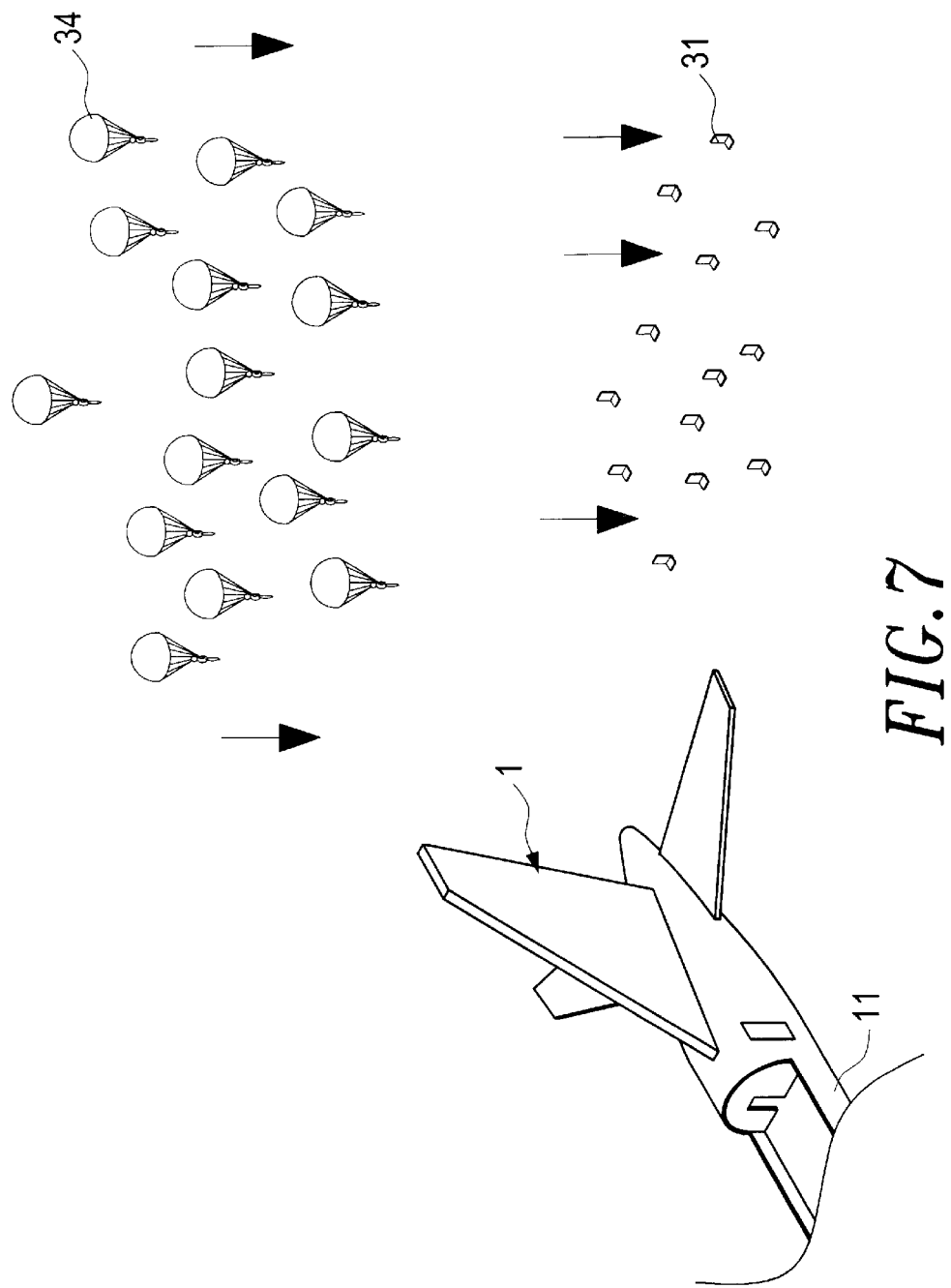
FIG. 7 is an illustration for the use of the ejection escape system for passenger airplane 4.

Please refer to FIGS. 1, 2 and 3. The ejection escape system for passenger airplane 1 in the present invention mainly includes:

A passenger airplane 1, which includes a body 11, a left top cabin cover 12, a right top cabin cover 13 and a cockpit 14, with an ejection device 15 on the left top cabin cover 12 and the right top cabin cover;

A locking mechanism 2, which includes several buckle pins 21 and the same quantity of buckle holes 22 at the corresponding position with controllable fasteners 221 controlled by a locking mechanism switch 23 inside the buckle holes 22; and Ejection escape seat 3, which includes a seat 31, an ejection device 32, a safety belt 33 and a parachute 34, among which the ejection device 32 is installed on the back of the seat 31, on the waist buckle belt 331 of the safety belt 33 there are two corresponding shoulder belts 332, on the rear side of which there is a back belt 333, while the parachute 34 is installed on the back belt 333, further, the two ends of the safety belt 33 are attached to the seat 31 through fasteners 334 and the parachute 34 is installed on the back belt 333 of the safety belt 33, besides, each ejection escape seat 3 is connected to an ejection escape seat switch 35;

The locking mechanism 2 is installed on the left top cabin cover 12, the right top cabin cover 13 and the corresponding sides on airplane body respectively. The passenger airplane 1 has several buckle pins 21 on the two sides of the left top cabin cover 12. At the connection of the right top cabin cover 13 and the left top cabin cover 12, there are the same quantity of buckle holes 22 at the corresponding position to the buckle pins 21 on the left top cabin cover 12. Each buckle hole 22 has controllable fasteners 221. At the connection of the right top cabin cover 13 and the body 11, there are several buckle pins 21. At the connection of the body 11, the left top cabin cove 12 and the right top cabin cover 13, there are the same quantity of buckle holes 22 at the corresponding position to the buckle pins 21 of the left top cabin cover 12 and the right top cabin cover 13. The buckle pins 21 connect the buckle holes 22 with retainers to secure the connection, so the left top cabin cover 12, the right top cabin cover 13 and the airplane body 11 are connected. Further, each ejection escape seat 3 is attached to the cabin of the airplane 1 through the locking mechanism 2. Both the locking mechanism switch 23 and the ejection escape seat switch 35 are installed in the cabin 14 of the airplane 1.

Figure 9:
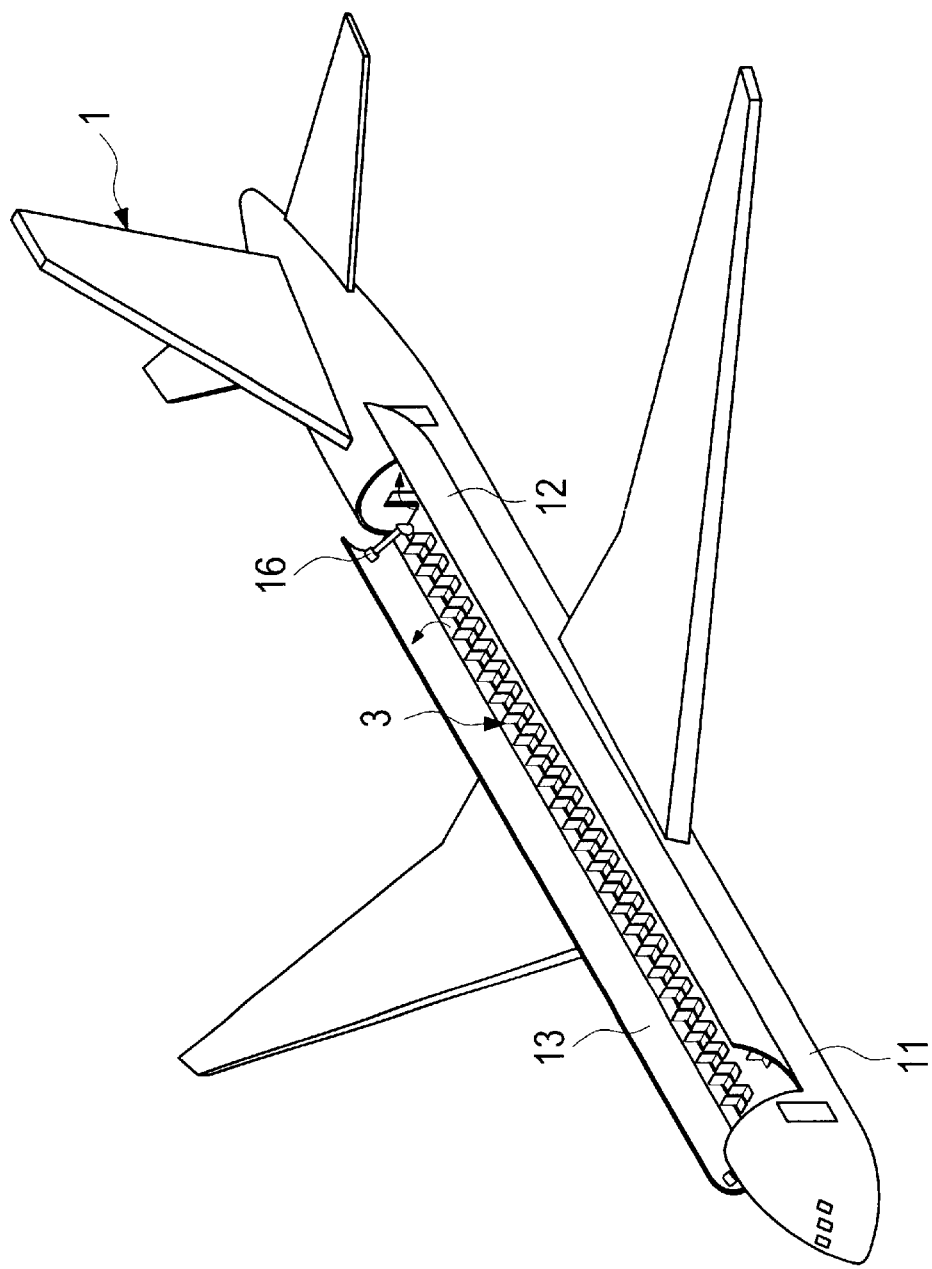
FIG. 9 is an illustration for another embodiment using the ejection escape system.

Please refer to FIGS. 4, 5, 6 and 7. When the airplane 1 is in an accident, the pilot presses the locking mechanism switch 23 in the cockpit 14, so the fasteners 22 of the locking mechanism 2 at the connection of the body 11, the left top cabin cover 12 and the right top cabin cover 13 depart from their original position and the buckle pins 21 of the locking mechanism 2 are disconnected. Thus, the left top cabin cover, the right top cabin cover 13 and the body 11 will separate. Then the pilot presses the ejection escape seat switch 35 in the cockpit 14 of the plane 1, so the locking mechanism 2 between the ejection escape seat 3 and the airplane 1 will be open. Meanwhile, the fasteners 334 at the two ends of the safety belt 33 on the ejection escape seat 3 depart from the seat 31 and the ejection device 32 on the back of the seat 3 is triggered to allow the passenger with the seat 31 and the ejection device 32 to be ejected from the left top cabin cover 12 and the right top cabin cover 13 to outside the airplane 1. When the ejection escape seat 3 is ejected at the highest point and starts to drop, the parachute 34 on the safety belt 33 will be open. At this moment, since the safety belt 33 has been separated from the seat 31, the heavier seat 31 will drop first and the passenger of the airplane 1 will drop slowly due to the parachute 34. When the left top cabin cover 12 and the right top cabin cover 13 are departing from the airplane body 11, the ejection device 15 ejects the left top cabin cover 12 and the right top cabin cover 13 toward the two sides of the airplane 1 to prevent any danger of the left top cabin cover 12 and the right top cabin cover 13 hitting to the airplane 1 as well as the ejection escape seat 3 hitting to the left top cabin cover 12 and the right top cabin cover 13, which may cause unwanted casualties. Besides, please refer to FIG. 9. The connection of the left top cabin cover 12 and the right top cabin cover 13 with the airplane body 11 can adopt hydraulic pressurization device 16 instead of the locking mechanism 2. When ejection escape is activated in the airplane 1, it only needs to open the left top cabin cover 12 and the right top cabin cover 13 by using the hydraulic pressurization device 16 and then eject the ejection escape seat 3 out of the airplane 1.

Figure 8:
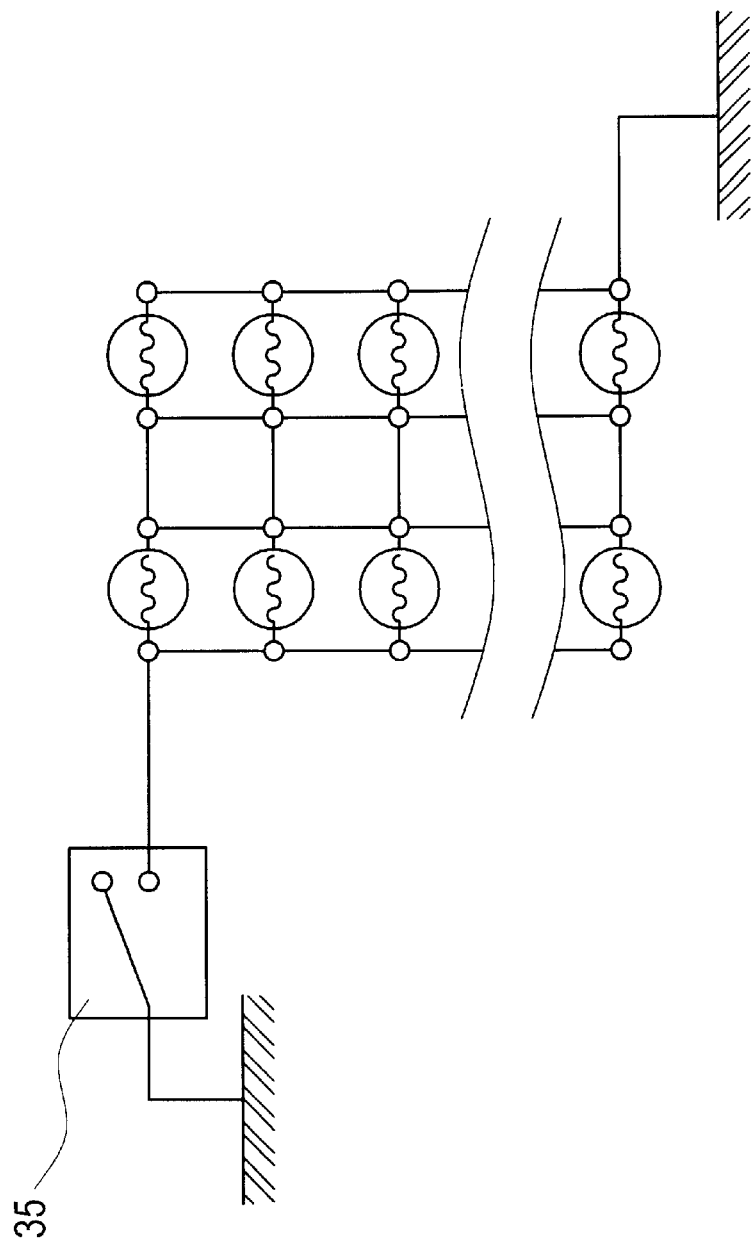
FIG. 8 is the electrical circuit diagram for the ejection escape seat.

Please refer to FIG. 8. The ejection escape system switch is in the cockpit and controlled by the pilot. Particularly, the ejection escape is allowed only when the airplane 1 is in emergency. Therefore, the electrical circuit for the ejection escape seat 3 is parallel to save the operation time for the pilot, who then will have more time to solve the problem in the airplane 1.

Further, at the locking mechanism at the connection of the left top cabin cover 12, the right top cabin cover 13 and the airplane body 11, the original buckle pin 21 can be replaced by the buckle hole 22 with controllable fastener 221, while the original buckle hole 22 can be replaced by the buckle pin 21.

When the ejection escape system for passenger airplane is compared with the conventional technology, it has the following advantages:

1. It uses a locking mechanism to open the left top cabin cover and the right top cabin cover and uses ejection escape seat to eject the passenger out of the airplane. Thus, when the airplane is in emergency, the passengers can escape rapidly and safely with minimized casualties.

2. It uses ejection device to eject the left top cabin cover and the right top cabin cover toward the two sides of the airplane, so the danger of the left top cabin cover and the right top cabin cover hitting the airplane can be avoided.

3. It uses ejection device to eject the left top cabin cover and the right top cabin cover toward the two sides of the airplane, so the danger of the ejection escape system hitting the left top cabin cover or the right top cabin cover can be avoided.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An ejection system for a passenger airplane comprising:
   a) an airplane having:
      i) a body;
      ii) a left top cabin cover; and
      iii) a right top cabin cover, the left top cabin cover and the right top cabin cover movably connected with the body to form the airplane;
   b) a plurality of ejection escape seats located within the airplane body, each ejection escape seat having:
      i) a seat;
      ii) an ejection device connected to the seat;
      iii) a safety belt releasably connected to the seat, the safety belt being released from the seat upon ejection of the seat from the airplane body; and
      iv) a parachute connected to the safety belt and stored in the seat; and
   c) a locking mechanism connected to the left top cabin cover, the right top cabin cover, the airplane body and the plurality of ejection escape seats, the locking device being movable between a locked position and an unlocked position, wherein:
      i) in the locked position, the locking mechanism locks the left top cabin cover, the right top cabin cover and the airplane body together, and locks each of the plurality of ejection escape seats to the airplane body; and
      ii) in the unlocked position, the locking mechanism disconnects the left top cabin cover and the right top cabin cover from the body, and each of the plurality of ejection escape seats from the body.

2. The ejection system for the passenger system according to claim 1, further comprising an ejection device connected to the left top cabin cover and the right top cabin cover.

3. The ejection system for the passenger system according to claim 1, wherein the locking mechanism includes a plurality of buckle pins and a plurality of buckle holes, each buckle hole having a controllable fastener, wherein each buckle pin is inserted into one of the plurality of buckle holes and controllably retained in the buckle hole by the controllable fastener.

4. The ejection system for the passenger system according to claim 1, wherein the safety belt includes a waist buckle belt, a plurality of shoulder straps, a back belt, and a plurality of fasteners.

5. The ejection system for the passenger system according to claim 1, further comprising a locking mechanism switch to control the operation of the locking mechanism.

6. The ejection system for the passenger system according to claim 1, further comprising an ejection escape seat switch.

7. An ejection system for a passenger system comprising:
   a) an airplane having:
      i) a body;
      ii) a left top cabin cover; and
      iii) a right top cabin cover, the left top cabin cover and the right top cabin cover movably connected with the body to form the airplane;
   b) a plurality of ejection escape seats located within the airplane body, each ejection escape seat having:
      i) a seat;
      ii) an ejection device connected to the seat;
      iii) a safety belt releasably connected to the seat, the safety belt being released from the seat upon ejection of the seat from the body; and
      iv) a parachute connected to the safety belt and stored in the seat; and
   c) a hydraulic pressurized device that controls the movement of the left top cabin cover and the right top cabin cover, and locks the left top cabin cover and the right top cabin cover to the body.

8. The ejection system for the passenger system according to claim 7, further comprising an ejection device connected to the left top cabin cover and the right top cabin cover.

9. The ejection system for the passenger system according to claim 7, wherein the safety belt includes a waist buckle belt, a plurality of shoulder straps, a back belt, and a plurality of fasteners.

10. The ejection system for the passenger system according to claim 7, further comprising an ejection escape seat switch.

* * * * *